(No Model.) 3 Sheets—Sheet 1.
H. N. HEMINGWAY
STEAM GENERATOR AND HOT WATER HEATER.
No. 427,079. Patented May 6, 1890.
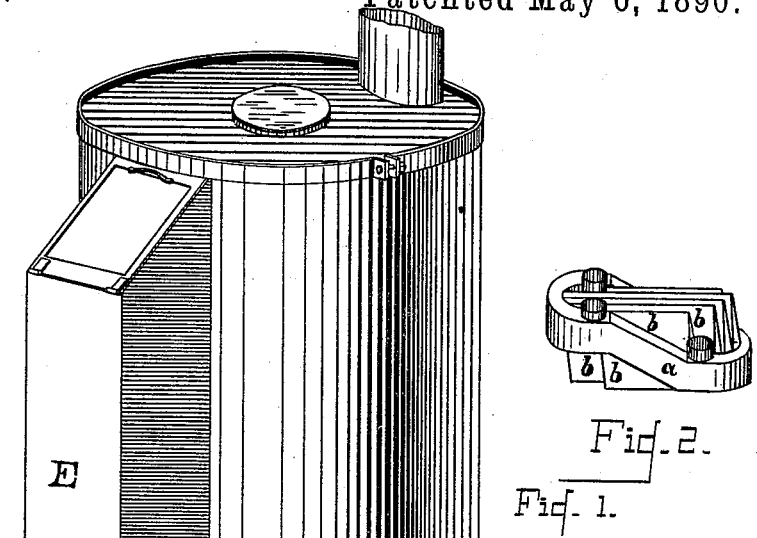
Fig. 2.
Fig. 1.
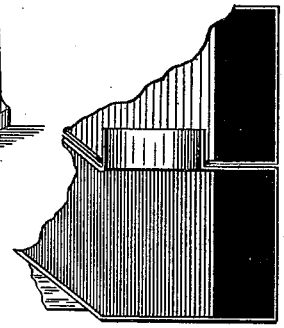
Fig. 3.
Fig. 5.
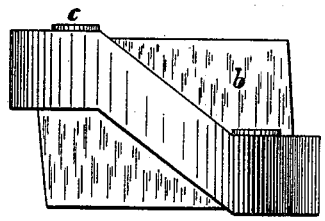
Fig. 4.
Witnesses:
Lewis E. Carpenter
George Underwood
Inventor:
Henry N. Hemingway,
by Frederick J. Allen
Attorney.

(No Model.) 3 Sheets—Sheet 2.

H. N. HEMINGWAY.
STEAM GENERATOR AND HOT WATER HEATER.

No. 427,079. Patented May 6, 1890.

Witnesses.
Lewis E. Carpenter
George Underwood

Inventor.
Henry N. Hemingway
by Frederick S. Allen
Attorney.

(No Model.) 3 Sheets—Sheet 3.

H. N. HEMINGWAY.
STEAM GENERATOR AND HOT WATER HEATER.

No. 427,079. Patented May 6, 1890.

Witnesses
Lewis E. Carpenter
George Underwood

Inventor
Henry N. Hemingway
by Frederick J. Allen
Attorney

THE NORRIS PETERS CO., PHOTO-LITHO., WASHINGTON, D. C.

UNITED STATES PATENT OFFICE.

HENRY N. HEMINGWAY, OF AUBURN, NEW YORK.

STEAM-GENERATOR AND HOT-WATER HEATER.

SPECIFICATION forming part of Letters Patent No. 427,079, dated May 6, 1890.

Application filed June 15, 1889. Serial No. 314,477. (No model.)

*To all whom it may concern:*

Be it known that I, HENRY N. HEMINGWAY, of the city of Auburn, New York, have invented certain new and useful Improvements in Steam-Generators and Water-Heaters, of which the following is a description, reference being had to the accompanying drawings, in which—

Figure 6:
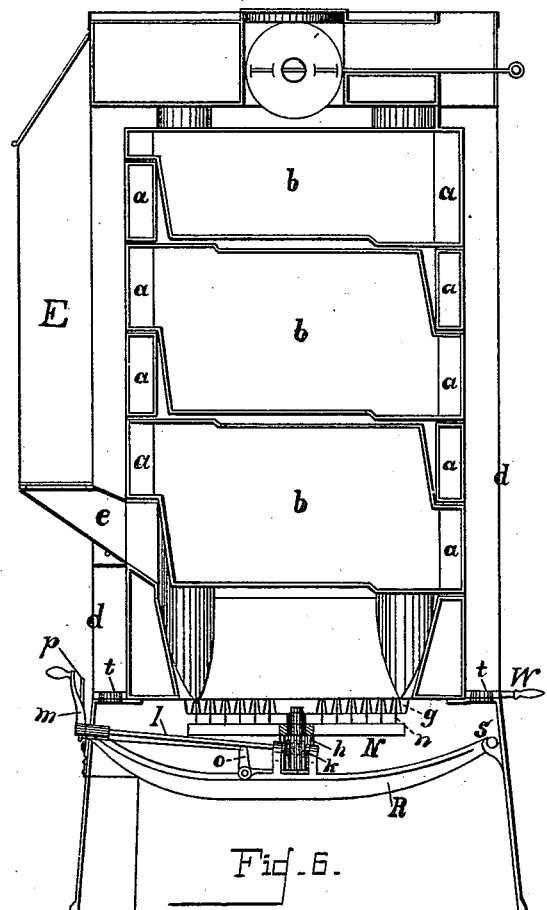
Figure 7:
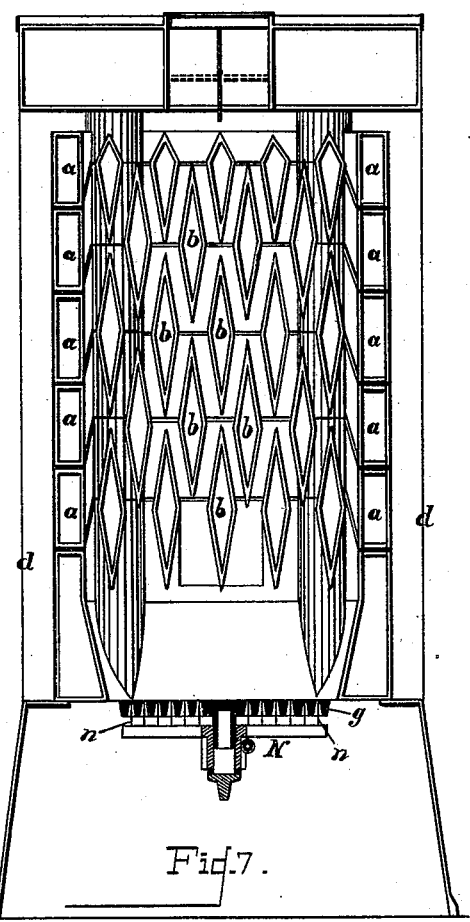
Figure 8:
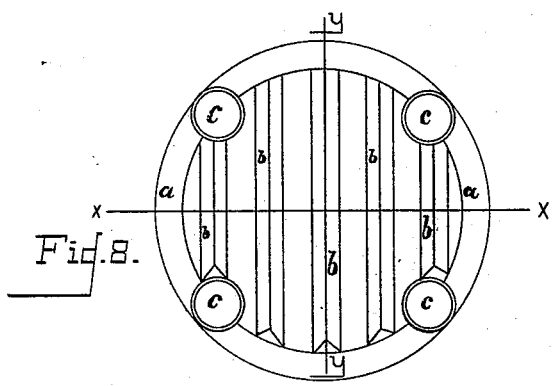
Figure 9:
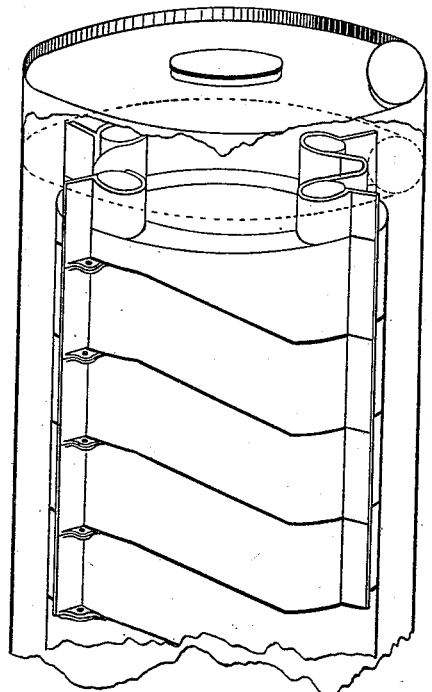
Figure 10:
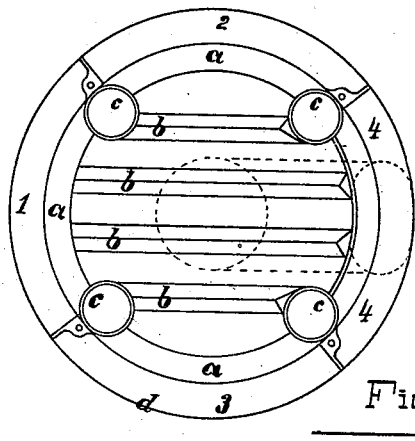

Figure 1 is a general perspective view; Fig. 2, a perspective view of a section. Fig. 3 is a section through a tube. Fig. 4 is a side view of a section; Fig. 5, a detail showing the joining of two sections. Fig. 6 is a vertical section on the line $y\,y$ of Fig. 8. Fig. 7 is a vertical section on the line $x\,x$ of Fig. 8. Fig. 8 is a plan of a section. Fig. 9 is a perspective view of the generator or heater with part of the casing removed, and Fig. 10 is a top view of the same.

My improvements relate to the construction of the sections of a cast-iron steam-generator or apparatus for heating water for hot-water circulation.

The sections of which my generator is made are shown in Fig. 2. They consist of a water-ring, which is provided with straight transverse water-tubes of the parallelogram form shown in Figs. 3 and 7. For the larger sizes it is advisable to use a stay or stays across within these tubes, as shown in Fig. 3, to strengthen them. The water-ring of these sections is made of about one-half the height of the cross-tubes, and at one side is brought to the top and at the other to the bottom of the tubes, whereby the tubes interlock as the sections are piled and a great amount of surface is obtained. Packing is placed between the joints $c\,c\,c\,c$, where the sections are connected, and the water can circulate freely thereby. Flanges on the outside of the sections, Fig. 10, enable them to be bolted together, and also support an exterior casing $d$. The gaseous products of combustion rise among the tubes $b\,b$ and passing outward descend in three out of four of the spaces within this exterior casing 1 2 3, Fig. 10, and at the grate-section turn upward in 4 and pass to the chimney, thereby making a return-flue.

Having thus described my invention, what I claim as new, and desire to secure by Letters Patent, is—

1. In a steam-generator or water-heater, a section consisting of a peripheral water-ring and connecting transverse tubes, the said ring being about one-half of the height of said tubes and being elevated on one side of said section and depressed on the other.

2. In a steam-generator or water-heater, a section consisting of a peripheral water-ring and connecting transverse water-tubes of diamond shape in cross-section, the said ring being about one-half the height of said tubes and being elevated on one side of the section and depressed on the other, and the said elevated and depressed portions, which are horizontal, being connected by an inclined portion.

3. A steam-generator or water-heater composed of two or more sections having one side thereof elevated and the other depressed, and having transverse water-tubes of substantially double the height of the ring, whereby they interlock when piled.

HENRY N. HEMINGWAY.

Witnesses:
FREDERICK I. ALLEN,
GEORGE UNDERWOOD.